(12) United States Patent
Kawamata et al.

(10) Patent No.: US 6,250,076 B1
(45) Date of Patent: Jun. 26, 2001

(54) SADDLE-TYPE VEHICLE INCLUDING AN EXHAUST SECONDARY AIR VALVE

(75) Inventors: Noriyuki Kawamata; Yuichi Kato, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/484,215

(22) Filed: Jan. 18, 2000

(30) Foreign Application Priority Data

Jan. 18, 1999 (JP) ................................... 11-009410

(51) Int. Cl.$^7$ ....................................................... F01N 3/10
(52) U.S. Cl. ................. 60/304; 60/293; 60/307; 180/68.3
(58) Field of Search ............................ 60/293, 304, 307; 180/68.3, 219

(56) References Cited

U.S. PATENT DOCUMENTS

| 4,387,565 | * | 6/1983 | Otani et al. | 60/293 |
| 4,417,442 | * | 11/1983 | Ikenoya et al. | 60/293 |
| 4,434,615 | * | 3/1984 | Ikenoya et al. | 60/293 |
| 4,508,189 | * | 4/1985 | Kato | 180/219 |
| 5,657,628 | * | 8/1997 | Takeuchi | 60/293 |

FOREIGN PATENT DOCUMENTS

| 59-68514 | * | 4/1984 | (JP) . |
| 59-90715 | * | 5/1984 | (JP) . |
| 59-99020 | * | 6/1984 | (JP) . |
| 59-99023 | * | 6/1984 | (JP) . |
| 60-79115 | * | 5/1985 | (JP) . |
| 62-270878 | | 9/1994 | (JP) . |

* cited by examiner

Primary Examiner—Thomas Denion
Assistant Examiner—Tu M. Nguyen
(74) Attorney, Agent, or Firm—Birch, Stewart, Kolasch & Birch, LLP (57) ABSTRACT

To provide an exhaust secondary air system intended to shorten the length of secondary air feed pipes connected to an exhaust secondary air valve thereby making compact the exhaust secondary air system including the secondary air feed pipes, and also to cool the exhaust secondary air valve and the secondary air feed pipes with running wind. A saddle-type vehicle includes a main frame extending rearwardly from a head pipe; a down frame extending downwardly from the head pipe; an engine disposed under the main frame and behind the down frame; and an exhaust secondary air valve, connected to a secondary air feed pipe, for feeding secondary air to an exhaust passage of the engine via the secondary air feed pipe; wherein the exhaust secondary air-valve is mounted on the down frame.

14 Claims, 6 Drawing Sheets

SADDLE-TYPE VEHICLE INCLUDING AN EXHAUST SECONDARY AIR VALVE

BACKGROUND OF THE INVENTION

1. Field of the Invention

The present invention relates to an exhaust secondary air valve, more particularly, an exhaust secondary air valve for a saddle-type vehicle including an engine disposed under a main frame and behind a down frame.

2. Background Art

Japanese Patent Laid-open No. Hei 6-270878 describes an exhaust secondary air system for feeding secondary air to an exhaust passage of an engine mounted on a saddle-type vehicle. Using this arrangement, a motorcycle is capable of oxidizing HC and CO contained in exhaust gas discharged from a combustion chamber of the engine into the exhaust passage.

The exhaust secondary air system described in the above document, which includes an air cleaner used for secondary air and a reed valve, is mounted on a bracket fastened to a mounting plate provided between right and left main frames positioned behind a head pipe of the motorcycle. An air outlet of the reed valve of the exhaust secondary air system is directed rearwardly of the vehicle. Accordingly, a secondary air feed pipe connected from a reed valve to an exhaust port of the engine extends slightly obliquely and upwardly from the air outlet of the reed valve to the rear side of the vehicle, being U-turned, and extends slightly obliquely and downwardly to the front side of the vehicle to be returned again to the vicinity of the reed valve. The secondary air feed pipe is then curved downwardly substantially at right angles, extending to the vicinity of the cylinder head of the engine, and further extends to be communicated to the exhaust port of the engine.

SUMMARY OF THE INVENTION

According to the above-described background art structure, because the exhaust secondary air system is disposed between the right and left main frames of the vehicle at an upper position of the vehicle relatively apart from the engine, the length of the secondary air feed pipe is relatively long. Furthermore, since the secondary air feed pipe is curved, for example, U-turned once over the cylinder head cover as described above, the length of the secondary air feed pipe is unnecessarily extended, with a result that it is difficult to make compact the exhaust secondary air system including the secondary air feed pipe. Additionally, since it is required to ensure a space for containing the longer curved secondary air feed pipe, the layout of the components around the exhaust secondary air system is limited. As a result, it becomes difficult to realize a compact layout of the components around the exhaust secondary air system.

Since the exhaust secondary air system is mounted to the vehicular frame via the bracket and the mounting plate, it is required to additionally prepare the mounting plate for mounting the exhaust secondary air system to the vehicle.

In view of the disadvantages of conventional exhaust secondary valves, an object of the present invention is to provide an exhaust secondary air system configured such that an exhaust secondary air valve is mounted on a vehicular frame for supporting an engine in a manner which implements relatively short secondary air feed pipes, thus resulting in a compact exhaust secondary air system. Another object of the present invention is to provide an exhaust secondary air valve and secondary air feed pipes which are air-cooled.

To achieve the above objects, there is provided a saddle-type vehicle including a main frame extending rearwardly from a head pipe; a down frame extending downwardly from the head pipe; an engine disposed under the main frame and behind the down frame; and an exhaust secondary air valve, connected to a secondary air feed pipe, for feeding secondary air to an exhaust passage of the engine via the secondary air feed pipe, wherein the exhaust secondary air valve is mounted on the down frame.

With this configuration, the down frame of the saddle-type vehicle for supporting the engine is located near the engine, while extending downwardly toward the engine positioned under the main frame, and the exhaust secondary air valve mounted on the down frame is also located near the engine. As a result, the length of the secondary air feed pipes extending from the exhaust secondary air valve to the exhaust passage of the engine can be shortened and thereby the exhaust secondary air system can be made compact.

Since the down frame of the saddle-type vehicle is exposed to airflow, the exhaust secondary air valve mounted on the down frame and the secondary air feed pipes connected thereto are sufficiently cooled. As a result, the exhaust secondary air valve and the secondary air feed pipes are prevented from being overheating due to heat released from the engine. Therefore, improved durability of the exhaust secondary air valve is achieved. Furthermore, since air flowing in the secondary air feed pipes does not reach excessively high temperature, it is possible to lower the reduction in density of the air and hence to suppress the reduction in purifying ratio of the exhaust gas.

Moreover, since the exhaust secondary air valve is mounted on the down frame constituting part of the existing frame structure of the vehicle, and additional mounting plate is not required to employ the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
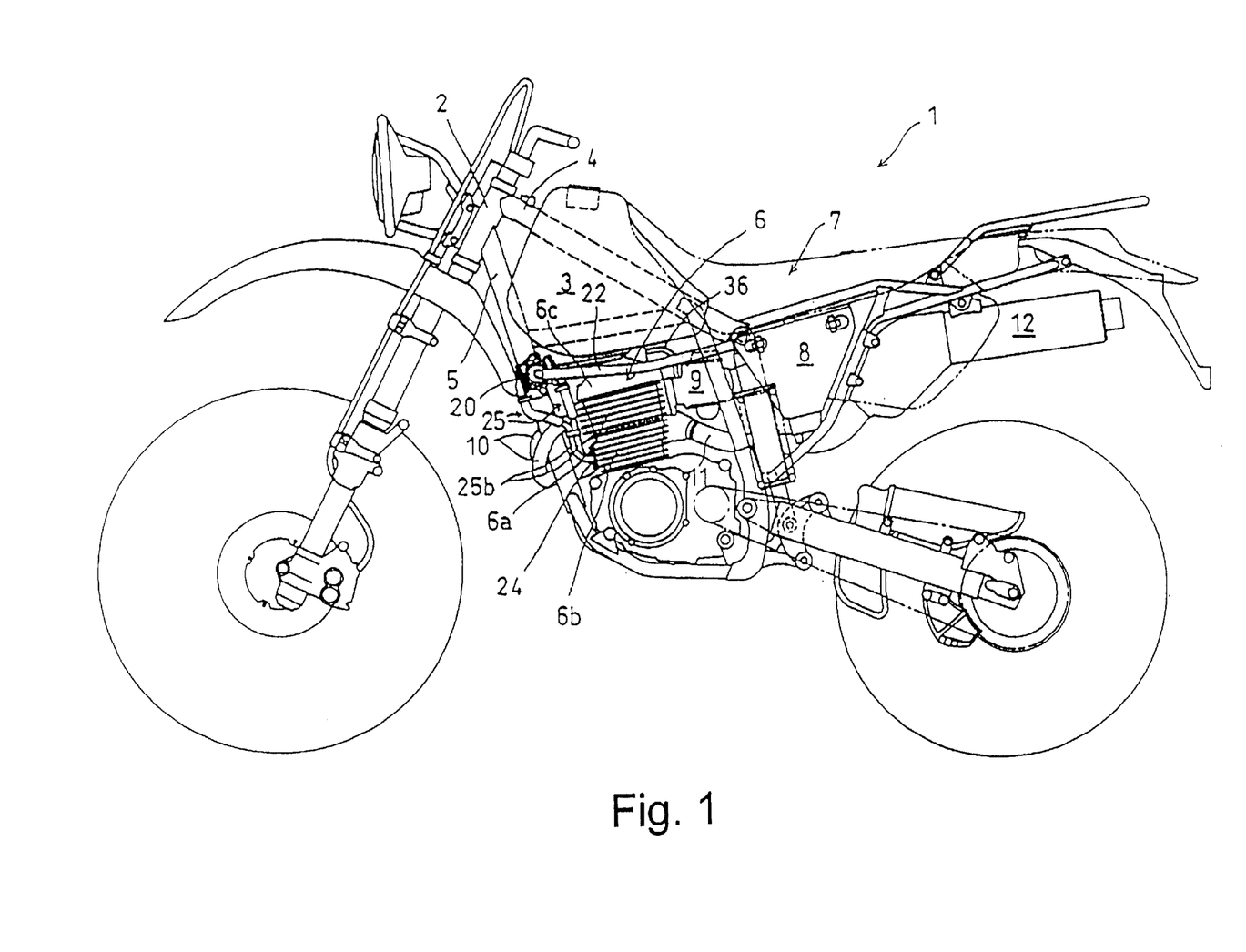
FIG. 1 is a schematic side view of a saddle-type vehicle including an exhaust secondary air valve according to one embodiment of the present invention.
Figure 2:
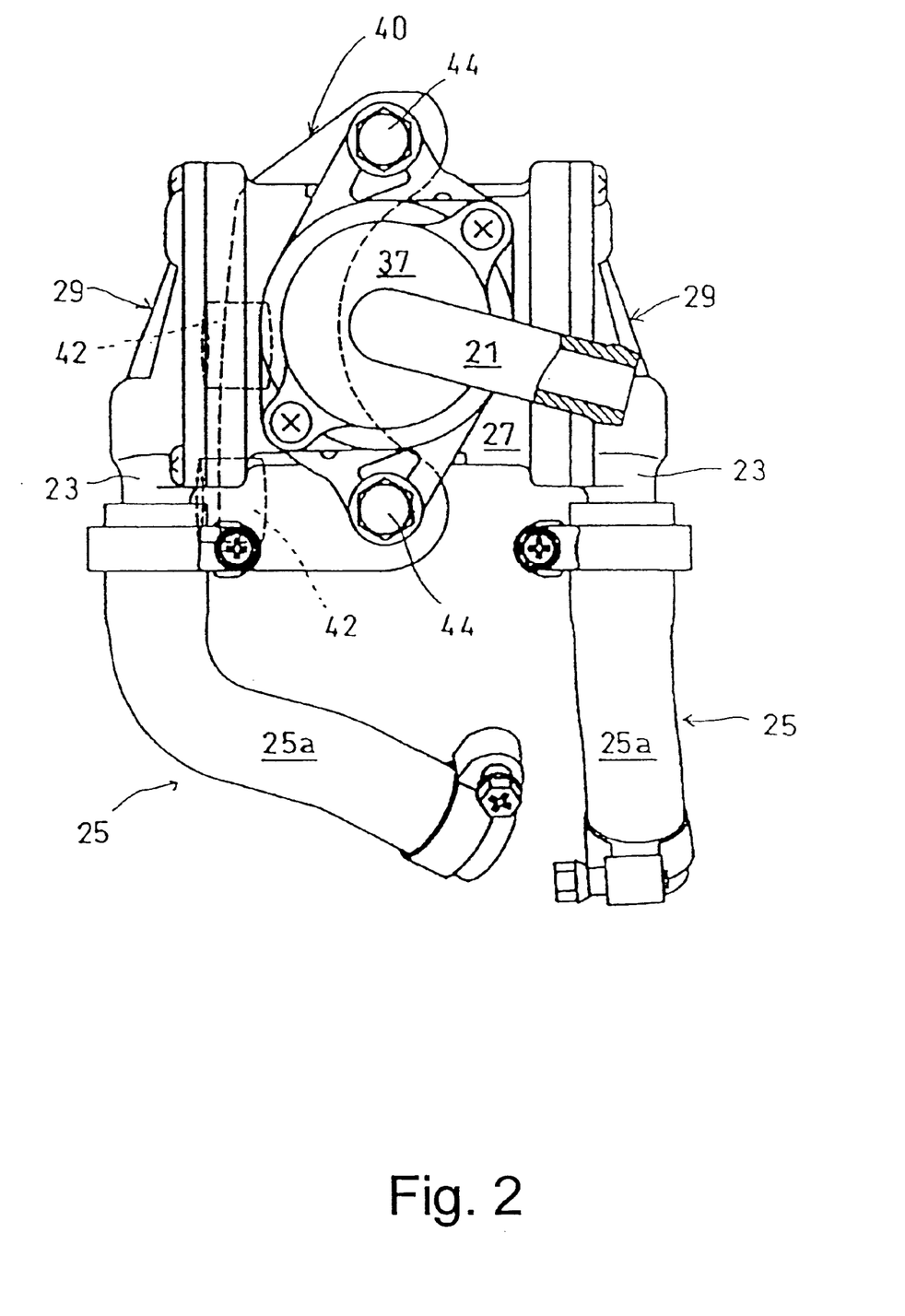
FIG. 2 is a side view of an exhaust secondary air valve to which a stay is mounted.

Hereinafter, a saddle-type vehicle according to one embodiment of the present invention will be described with reference to FIGS. 1 to 7. FIG. 1 is a schematic side view of the saddle-type vehicle of the present invention, which is configured as a motorcycle 1 in this embodiment. The motorcycle 1 has a frame structure called a semi-double cradle including a head pipe 2, a main frame 4 extending rearwardly from the head pipe 2, while passing through a recess formed in the back surface of a fuel tank 3, and a down frame 5 extending downwardly from the head pipe 2.

An engine 6, positioned under the main frame 4 and behind the down frame 5, is an air-cooled overhead-valve type four stroke/one-cycle engine which has one cylinder, two intake valves and two exhaust valves. However, the present invention is not limited to one cylinder engines.

A crank shaft of the engine 6 extends in the horizontal direction from right to left of the vehicle, and the cylinder axial line of the engine 6 is tilted forwardly. Air sucked from an air cleaner 8 positioned under a seat 7 is mixed with fuel in a carburetor 9. The air-fuel mixture is fed from the carburetor 9 into a combustion chamber of the engine 6 via an intake manifold and two intake ports opened on the rear side of a cylinder head 6a of the engine 6.

Two exhaust pipes 10 are disposed on the right side of the engine 6 and connected to two exhaust ports opened on the front side of the cylinder head 6a of the engine 6. An exhaust pipe 11 is connected to the downstream ends of the two exhaust pipes 10. Exhaust gas having passed through the two exhaust pipes 10 is collected in the exhaust pipe 11. In the exhaust pipes 10 and 11, HC and CO in the exhaust gas are oxidized by exhaust secondary air fed thereto, and the exhaust gas thus purified is released to atmospheric air through a muffler 12.

As shown in FIGS. 1 to 5, an exhaust secondary air system includes an exhaust secondary air valve 20, a secondary air suction pipe 22 (see FIG. 1), two secondary air feed pipes 25 (see FIG. 1), and two secondary air feed holes (not shown). The secondary air suction pipe 22 has the upstream end communicated to a clean side of the air cleaner 8 and has the downstream end connected to an air inlet pipe 21 of the exhaust secondary air valve 20. The secondary air feed pipes 25 have the upstream ends connected to two air outlet pipes 23 of the exhaust secondary air valve 20 and have the downstream ends connected to two connection ports 24 formed in a cylinder block 6b.

The secondary air feed pipes 25 extend along the cylinder from the connection ports 24 to the cylinder head 6a through the cylinder block 6b, and further extend through the cylinder head 6a to be communicated to the exhaust ports constituting part of the exhaust passage. Each of the secondary air feed pipes 25 is composed of a hose 25a connected to the air outlet pipe 23, and a pipe 25b having one end connected to the hose 25a and the other end connected to the connection port 24. Accordingly, secondary air introduced from the exhaust secondary air valve is fed into the exhaust ports through the secondary air feed pipes 25 and the secondary air feed holes, and is fed into the exhaust pipes 10 and 11 in a state being mixed with the exhaust gas flowing there into from the combustion chamber.

Figure 3:
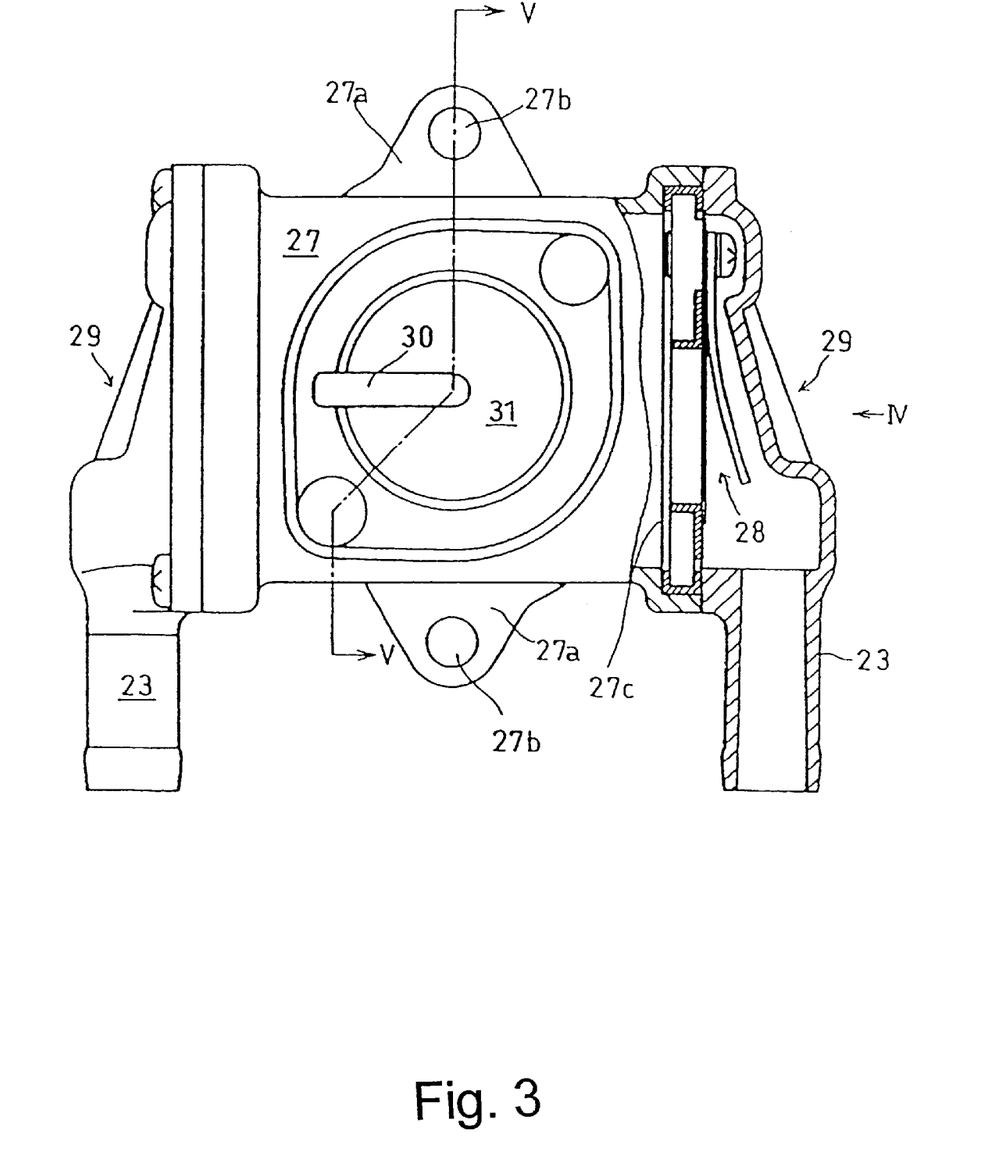
FIG. 3 is a side view, seen from the diaphragm cover side, of an exhaust secondary air valve.
Figure 4:
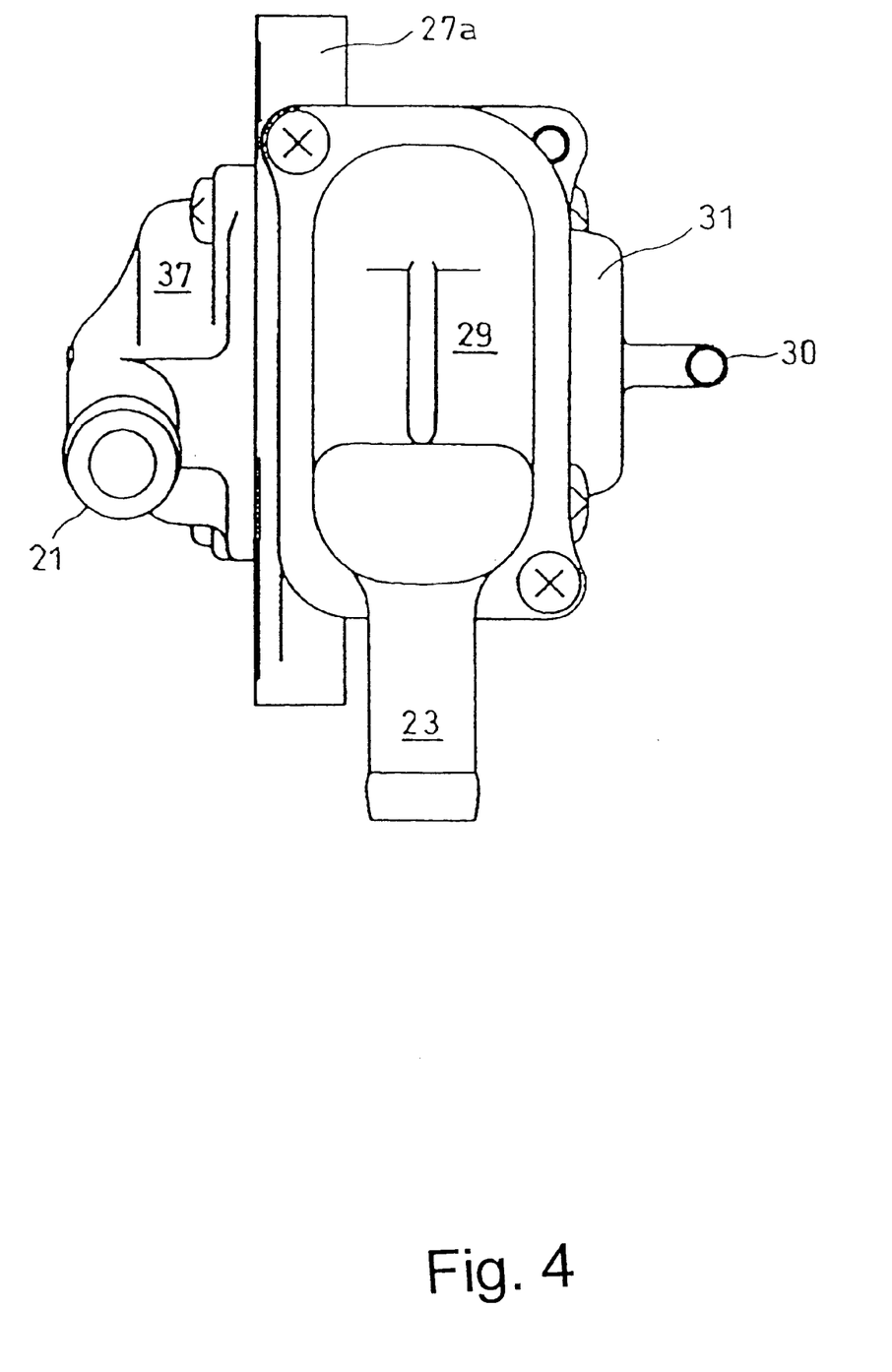
FIG. 4 is a view seen along the direction shown by an arrow IV in FIG. 3.

The structure of the exhaust secondary air valve 20 will be described with reference to FIGS. 3 and 5. The exhaust secondary air valve 20 includes a valve body 27 having a cavity 26. Two mounting flanges 27a, opposed to each other, are formed in such a manner as to project outwardly from the valve body 27.

The valve body 27 has two opening portions 27c which are communicated to the cavity 26 and opposed to each other. The opening portions 27c are opened in the direction perpendicular to the projecting direction of the mounting flanges 27a from the valve body 27. A reed valve 28 and a reed valve cover 29 for covering the reed valve 28 are mounted to each of the opening portions 27c. The reed valve cover 29 is integrated with the air outlet pipe 23. The reed valve 28 is opened/closed by an exhaust pulsation pressure which occurs in the exhaust port and is applied to the reed valve 28 through the secondary air feed pipe 25.

A diaphragm chamber cover 31 formed with a negative pressure introduction pipe 30 is mounted on one surface side of the valve body 27 in the axial line direction of a bolt hole 27b formed in the mounting flange 27a. The peripheral edge of a diaphragm 34 is held between the valve body 27 and the diaphragm chamber cover 31. A stem 33 to which a control valve 32 is mounted is fixed to the diaphragm 34. A negative pressure chamber 35 is formed between the diaphragm 34 and the diaphragm chamber cover 31. A negative pressure in the intake manifold is introduced in the negative pressure chamber 35 via a negative pressure pipe 36 (see FIG. 1) connected to the negative pressure introduction pipe 30, to control the position of the control valve 32 on the basis of the negative pressure fed from the intake manifold.

An opening portion 27d communicated to the cavity 26 is formed on the other surface side of the valve body 27 in the axial line direction of the bolt hole 27b formed in the mounting flange 27a, and is covered with an air inlet cover 37 having the air inlet pipe 21. The opening portion 27d is used for feeding air flowing from the air inlet pipe 21 to the upstream side of the reed valve 28. The amount of air passing through the opening portion 27d, that is, the amount of air flowing in the reed valve 28 is controlled by the control valve 32 mounted to the leading end of the stem 33 extending through the cavity 26 and the opening portion 27d.

The control of the amount of air performed by the control valve 32 on the basis of the negative pressure generated in the intake manifold and introduced in the negative pressure chamber 35 will be described below. If the negative pressure in the intake manifold is large, for example, due to a low load of the engine 6, the diaphragm 34 is moved to the left in FIG. 5 against the spring force of a return spring 38 and thereby the control valve 32 is also moved to the left. As a result, a gap between the opening portion 27d and the control valve 32 becomes small, thereby reducing the amount of air fed to the reed valve 28.

Figure 5:
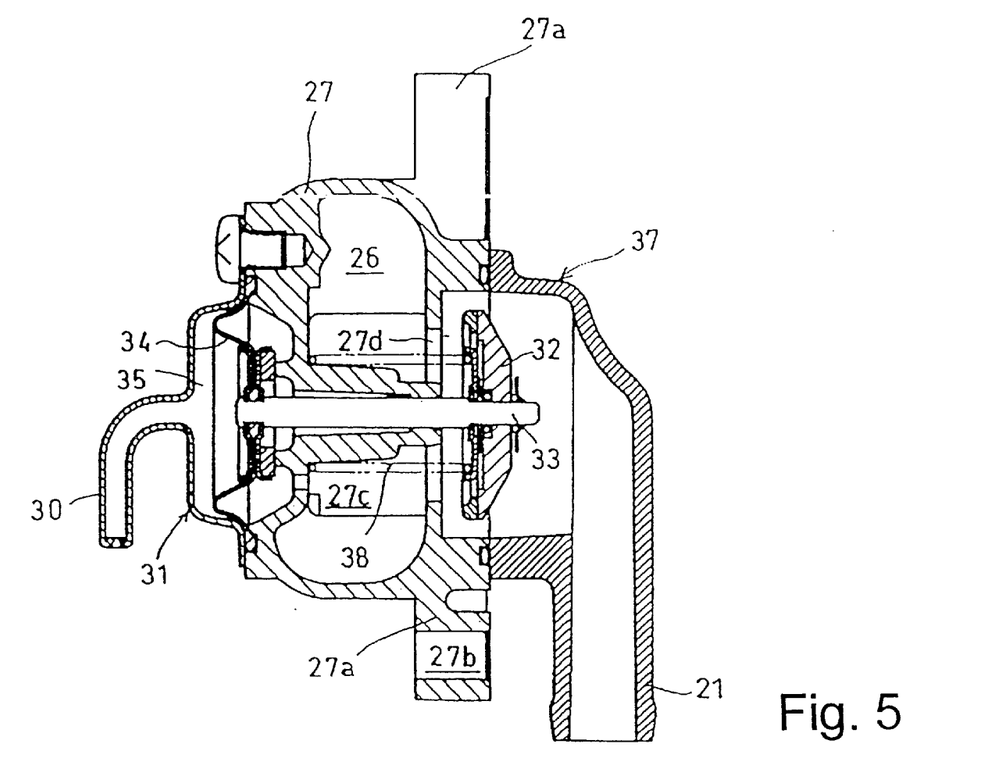
FIG. 5 is a sectional view mainly taken on line V—V of FIG. 3, with parts partially cutaway along a different line.

On the other hand, as the negative pressure in the intake manifold becomes small, for example, due to an increased load of the engine 6, the diaphragm 34 is moved to the right in FIG. 5 and thereby the control valve 32 is moved to the right. As a result, the gap between the opening portion 27d and the control valve 32 increases, thereby increasing the amount of air fed to the reed valve 28. By controlling the amount of air fed to the reed valve 28 on the basis of the operating state of the engine 6 as described above, the amount of secondary air fed to the exhaust ports by opening/closing the reed valve 28 can be controlled on the basis of the operating state of the engine 6.

The mounting of the exhaust secondary air valve 20 will be described with reference to FIGS. 1, 2, 6 and 7. The down frame 5 on which the exhaust secondary air valve 20 is to be mounted constitutes, together with the main frame 4, part of the frame structure for supporting the engine 6.

The down frame 5 is located in the vicinity of the engine 6. To be more specific, the down frame 5 extends downwardly from the head pipe 2 while passing through a recess formed on the front side of the fuel tank 3 and further extends, on the front side of the engine 6, downwardly, substantially in parallel to the axial line of the cylinder of the engine 6.

Figure 6:
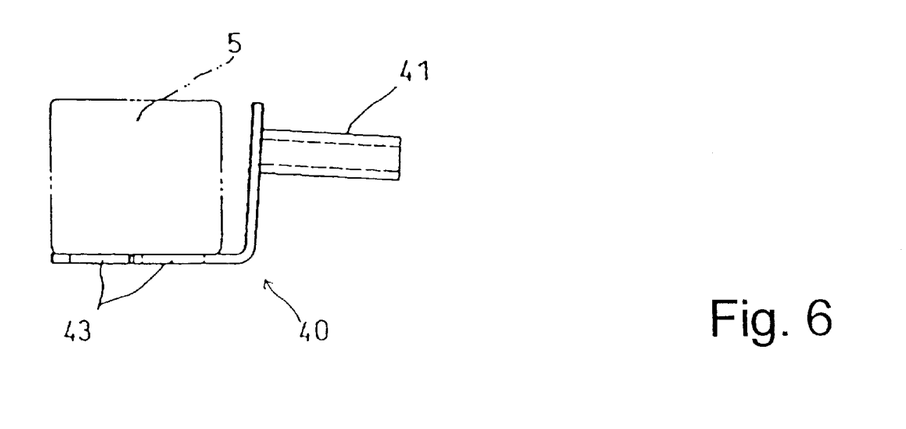
FIG. 6 is a plan view of the stay used for mounting the exhaust secondary air valve.
Figure 7:
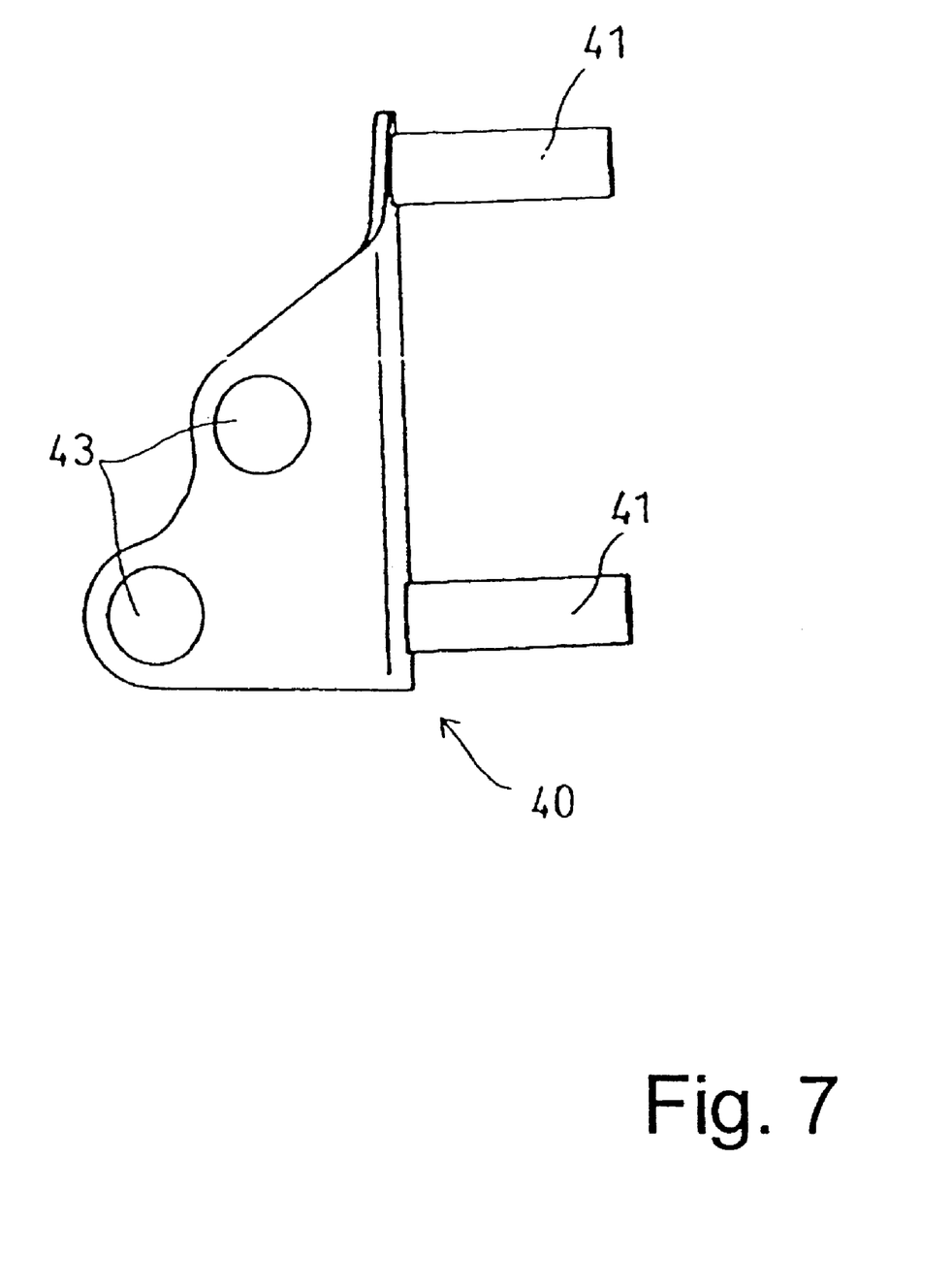
FIG. 7 is a side view showing the front side of the stay for the exhaust secondary air valve.

The exhaust secondary air valve 20 is mounted, by using a stay 40 shown in FIGS. 6 and 7, on the left side (on the front side of the paper plane in FIG. 1) of the down frame 5 at a position which is located under the above recess formed on the front side of the fuel tank 3 and which is located over a portion where a virtual plane, including a mating plane of the cylinder head cover 6c with the cylinder head 6a, crosses to the down frame 5.

The stay 40 is a plate-like member bent into an approximate L-shape. The stay 40, includes two cylindrical nuts 41 fixed on one of the L-shaped portions, and two holes 43, in which grommets 42 are to be fitted, formed in the other of the L-shaped portions. Bolts 44 allowed to pass through the bolt holes 27b formed in the mounting flanges 27a of the exhaust secondary air valve 20 are screwed with the nuts 41 of the stay 40, whereby the exhaust secondary air valve 20 is fixed to the stay 40. The stay 40 thus assembled with the exhaust secondary air valve 20 is fixed to the down frame 5 by means of the grommets 42. In the attentive, the use of only one cylindrical nut 41 and one hole 43 may be used with the present invention.

Since the down frame 5 for supporting the engine 6 is positioned near the engine 6 while extending downwardly toward the engine 6 located at the lower side of the vehicle, the exhaust secondary air valve mounted on the down frame 5 is located closer to the engine 6 as compared with the conventional art exhaust secondary air system. Accordingly, the length of the secondary air feed pipes 25 extending from the exhaust secondary air valve 20 to the engine 6 is shortened, thereby the exhaust secondary air system including the secondary air feed pipes 25 becomes compact. Moreover, since the length of the secondary air feed pipes 25 is shortened as described above, the flow resistance in the pipes 25 is small, thereby ensuring the necessary amount of secondary air.

Since respective components of the vehicle, including the fuel tank 3 and the engine 6, are disposed behind the down frame 5, a relatively large number of spaces are present around the down frame 5. In particular, as shown in FIG. 1, a relatively wide space is formed around the above-described mounting position of the exhaust secondary air valve 20 because the lower surface of the fuel tank 3 positioned over the above mounting position is curved and also the upper surface of the cylinder head cover 6c positioned under the above mounting position is tilted, thereby allowing the exhaust secondary air valve 20 to be disposed in a relatively wide space.

Additionally, since the fuel tank 3 positioned over the above mounting space and the engine 6 positioned under the above mounting space each have a lateral size (in the width direction of the vehicle) larger than that of the exhaust secondary air valve 20, the exhaust secondary air valve 20 is positioned between both the lateral end surfaces of each of the fuel tank 3 and the engine 6. As a result, if the vehicle is horizontally laid on the ground, there is only a small possibility that the exhaust secondary air valve 20 is brought into contact with the ground.

The secondary air suction pipe 22 connected to the air inlet pipe 21 of the exhaust secondary air valve 20 mounted at the above-described mounting space is connected to the air cleaner 8 behind the engine 6. To be more specific, on the side opposed to the exhaust pipes 10, the secondary air suction pipe 22 is disposed in a longitudinal space between the lower surface of the fuel tank 3 and the upper surface of the cylinder head cover 6c in such a manner as to extend in an approximately straight line with a slightly curved portion between both the lateral end surfaces of each of the fuel tank 3 and the cylinder head cover 6c.

The exhaust secondary air valve 20 is mounted on the down frame 5 positioned in front of the front side of the engine 6 having the exhaust ports and the connection ports 24. The air outlet pipes 23 of the exhaust secondary air valve 20, positioned in front of the engine 6, are connected to the connection ports 24 on the front side of the engine 6 by means of the secondary air feed pipes 25.

Since the two air outlet pipes 23 to which the secondary air feed pipes 25 are connected are opened downwardly, the secondary air feed pipes 25 are connected to the connection ports 24 positioned under the air outlet pipes 23 without occurrence of any curvature having a large radius. As described above, the length of the secondary air feed pipes 25 is short because the exhaust secondary air valve 20 is located closer to the engine 6. In addition to this, since the air outlet pipes 23 are opened downwardly, the length of the pipes 25 may be reduced in length.

In addition, because the exhaust secondary air valve 20 is located closer to the engine 6 as described above, it is warmed by heat released from the engine 6 and the exhaust pipes 10 and 11. However, the down frame 5 is located at a position exposed to air flow during the movement of the engine, the exhaust secondary air valve 20 and the secondary air feed pipes 25 mounted on the down frame 5 are also sufficiently exposed to the air flow and thereby are sufficiently cooled. As a result, the exhaust secondary air valve 20 and the secondary air feed pipes 25 are not warmed to an excessively high temperature irrespective of the presence of the heating source.

This embodiment having the above configuration exhibits the following effects:

Since the down frame 5 for supporting the engine 6 is located near the engine 6 while extending downwardly toward the engine 6, the exhaust secondary air valve 20 mounted on the down frame 5 is also located near the engine 6. Accordingly, the length of the secondary air feed pipes 25 extending from the exhaust secondary air valve 20 to the engine 6 can be shortened and thereby the exhaust secondary air system including the secondary air feed pipes 25 is compact. Moreover, since the length of the pipes 25 has been reduced, the flow resistance in the pipes 25 becomes small, so that it is possible to ensure the necessary amount of secondary air.

Additionally, since the exhaust secondary air valve 20 is located in the space formed between the fuel tank 3 and the engine 6 at a position over the portion where a virtual plane including a mating plane of the cylinder head cover 6c with the cylinder head 6a crosses to the down frame 5, the length of the secondary air feed pipes 25 from the exhaust secondary air valve 20 to the engine 6 can be shortened and also the exhaust secondary air valve 20 can be disposed without having an adverse effect on the disposition of peripheral components of the vehicle. Also the exhaust secondary air valve 20 is located in the space while being positioned between the lateral end surfaces of each of the fuel tank 3 and the engine 6, and accordingly, even if the vehicle is horizontally laid on the ground, the exhaust secondary air valve 20 is less likely to be brought into contact with the ground and thereby less susceptible to damage due to such an occurrence.

The secondary air feed pipes 25 are mounted on the down frame 5 positioned in front of the front side of the engine 6 having the connection ports 24 and further they are connected from the air outlet pipes 23 opened downwardly to the connection ports 24 positioned under the air outlet pipes 23, so that the length of the secondary air pipes 25 can be further shortened. Furthermore, since the secondary air feed pipes 25 are exposed to air flow and thereby cooled, air flowing in the secondary air feed pipes 25 is not warmed to an excessively high temperature, resulting in the reduction in the density of the air and hence suppresses the reduction in the purifying ratio of the exhaust gas.

Additionally, since the exhaust secondary air valve 20 mounted on the down frame 5 is sufficiently exposed to air flow and thereby cooled, it is not warmed to an excessively high temperature. As a result, it is possible to improve the durability of the exhaust secondary air valve 20.

Furthermore, since the exhaust secondary air valve 20 is mounted on the down frame 5, constituting part of the existing frame structure of the vehicle, via the stay 40, it is not required to provide a new mounting plate, unlike the above-described conventional art structure.

Since the secondary air suction pipe 22 is disposed near the cylinder head cover 6c on the side opposed to the side on which the exhaust pipes 10 and 11 are disposed, it is possible to reduce the adverse effect of heating due to the exhaust pipes 10 and 11 exerted on the secondary air, thereby lowering the reduction in density of air fed to the reed valve 28. Also since the secondary air suction pipe 22 is disposed in the approximately straight line, it is possible to shorten the length of the pipe 22.

In the above embodiment, the exhaust secondary air valve 20 has the control valve 32; however, the present invention is not limited thereto. For example, the exhaust secondary air valve 20 may be provided with no control valve 32, that is, may be provided with only the reed valve 28. Further, the reed valve 28 may be replaced with a different valve such as a pressure-sensitive valve or a solenoid valve.

While the exhaust secondary air valve 20 is mounted on the left side of the down frame 5 in the above embodiment, it may be mounted on the right, front or rear side of the down frame 5.

In the above embodiment, the exhaust secondary air valve 20 is mounted at the position which is located over the portion where the virtual plane including the mating plane of the cylinder head cover 6c with the cylinder head 6a crosses to the down frame 5 and which is under the fuel tank 3; however, it may be mounted at any mounting portion other than the above portion insofar as such a mounting portion has a space capable of containing the exhaust secondary air valve 20.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle-type vehicle, comprising:
   a head pipe;
   a main frame extending rearwardly from said head pipe;
   a down frame extending downwardly from said head pipe;
   an engine having at least one cylinder disposed beneath said main frame and rearwardly of said down frame;
   an exhaust secondary air valve mounted to said down frame and connected to a secondary air feed pipe, said exhaust secondary valve for feeding secondary air to an exhaust passage of said engine via the secondary air feed pipe; and
   a mounting member to which said exhaust secondary air valve is attached, said mounting member having two stay members for facilitating attachment of said exhaust secondary air valve thereto.

2. The saddle type vehicle according to claim 1, wherein said mounting member has two extended members which form essentially an L-shape, one of said two extended members has two holes therethrough, and another of said two extended members includes said two stay members.

3. The saddle type vehicle according to claim 2, wherein each of said to holes receives a grommet affixed to said down frame to thereby attach said mounting member to said down frame.

4. The saddle type vehicle according to claim 1, wherein said exhaust secondary air valve includes two mounting flanges, said mounting flanges for fixedly attaching said exhaust secondary air valve to said two stay members via attaching means.

5. The saddle type vehicle according to claim 4, wherein said attaching means is a plurality of bolts.

6. The saddle type vehicle according to claim 1, further comprising:
   a fuel tank positioned above said engine, said fuel tank positioned such that a front bottom rounded portion thereof starts essentially at a line drawn parallel from a cylinder of said engine, thereby creating a recess between the front bottom rounded portion of said fuel tank and the cylinder.

7. The saddle type vehicle according to claim 6, wherein said exhaust secondary air valve is mounted to said down frame at the recess created between said fuel tank and the cylinder.

8. The saddle type vehicle according to claim 1, wherein said exhaust secondary air valve includes an air inlet pipe and two air outlet pipes, said air inlet pipe being essentially perpendicular to said air outlet pipes.

9. The saddle type vehicle according to claim 8, wherein said air outlet pipes each has a secondary air feed pipe connected thereto, one of said secondary air feed pipes is essentially straight and perpendicular to said air inlet pipe, and another of said secondary air feed pipes is bent, wherein the bent part is essentially parallel to said air inlet pipe.

10. A saddle-type vehicle, comprising:
    an engine having at least one cylinder;
    a frame structure for supporting said engine;
    a fuel tank mounted to said frame structure and positioned above said at least one cylinder of said engine; and
    an exhaust secondary air valve mounted to said frame structure along a portion thereof running essentially parallel with said cylinder,
    wherein said exhaust secondary air valve is mounted to said frame structure via a mounting member having two extended members which form essentially an L-shape, one of said two extended members has at least one hole therethrough, and another of said two extended members includes at least one stay.

11. The saddle type vehicle according to claim 10, wherein said exhaust secondary air valve is mounted at a position between a recess created between said fuel tank and said cylinder.

12. The saddle type vehicle according to claim 11, wherein the recess is created by a bottom front rounded portion of said fuel tank and a front top edge of said cylinder.

13. The saddle type vehicle according to claim 10, wherein said exhaust secondary air valve is mounted to said frame structure via a removable mounting member, said mounting member being removable from both said exhaust secondary air valve and said frame structure.

14. The saddle type vehicle according to claim 10, wherein said mounting member mounts to said exhaust secondary air valve via said at lest one stay member, and mounts to said frame structure via fastening means utilizing said at least one hole.

* * * * *